United States Patent
Peng et al.

(10) Patent No.: US 10,903,773 B1
(45) Date of Patent: Jan. 26, 2021

(54) KINETIC ENERGY RECOVERY SYSTEM WITH FLYWHEEL

(71) Applicant: INDUSTRIAL TECHNOLOGY RESEARCH INSTITUTE, Hsin-Chu (TW)

(72) Inventors: Ming-Tsan Peng, Jhongli (TW); Chia-Lin Wu, Kaohsiung (TW); Huan-Lung Gu, Hualien (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 0 days.

(21) Appl. No.: 16/655,449

(22) Filed: Oct. 17, 2019

(30) Foreign Application Priority Data

Jul. 15, 2019 (TW) .............................. 108124834 A

(51) Int. Cl.
*H02P 27/05* (2006.01)
*H02K 7/02* (2006.01)

(52) U.S. Cl.
CPC ............. *H02P 27/05* (2013.01); *H02K 7/025* (2013.01); *H02P 2207/07* (2013.01)

(58) Field of Classification Search
CPC ...... H02P 27/05; H02P 2207/07; H02K 7/025
See application file for complete search history.

(56) References Cited

U.S. PATENT DOCUMENTS

| 7,071,581 | B2 | 7/2006 | Eisenhaure et al. |
| 9,837,996 | B2 | 12/2017 | Kuznetsov |
| 10,008,857 | B2 | 6/2018 | Kolhatkar et al. |
| 10,224,829 | B2 | 3/2019 | Permuy |

(Continued)

FOREIGN PATENT DOCUMENTS

| CN | 201041944 A | 3/2008 |
| CN | 102111062 A | 6/2011 |
| CN | 105871212 A | 8/2016 |

(Continued)

OTHER PUBLICATIONS

Liwen Pan et al., An Integrated Multifunctional Bidirectional AC/DC and DC/DC Converter for Electric Vehicles Applications, Energies, 2016, 9, 493.

(Continued)

*Primary Examiner* — Cortez M Cook
(74) *Attorney, Agent, or Firm* — Locke Lord LLP; Tim Tingkang Xia, Esq.

(57) ABSTRACT

A kinetic energy recovery system with flywheel includes a flywheel doubly-fed electric machine, an electric motor, a drive circuit and a controller. The flywheel doubly-fed electric machine has a primary side coil and a secondary side coil. The electric motor has a phase coil connected in series with the primary side coil. The drive circuit has an AC/DC circuit and a DC/AC circuit, wherein the AC end of the AC/DC circuit is coupled to the primary side coil; the AC end of the DC/AC circuit is coupled to the secondary side coil. The controller is configured to manipulate a frequency and a phase of output voltage and output current of the secondary side coil, thereby controlling the frequency and phase of a voltage and a current output from the primary side coil, thereby recovering a kinetic energy of the electric motor or providing the kinetic energy to the electric motor.

18 Claims, 10 Drawing Sheets

(56) References Cited

U.S. PATENT DOCUMENTS

2016/0336928 A1* 11/2016 Kuznetsov ............... H02J 3/30

FOREIGN PATENT DOCUMENTS

| CN | 104579060 B | 10/2017 |
|----|-------------|---------|
| CN | 107681684 A | 2/2018 |
| CN | 108988380 A | 12/2018 |
| GB | 430008 A | 6/1935 |
| TW | 463187 B | 11/2001 |
| TW | I453339 B | 9/2014 |

OTHER PUBLICATIONS

Juan De Santiago Ochoa, FEM Analysis Applied to Electric Machines for Electric Vehicles, Digital Comprehensive Summaries of Uppsala Dissertations from the Faculty of Science and Technology 845, 2011.

Anunay Gupta et al., A Review of Degradation Behavior and Modeling of Capacitors, ASME 2018 International Technical Conference and Exhibition on Packaging and Integration of Electronic and Photonic Microsystems, 2018.

Marguerite Touma-Holmberg et al., Double Winding, High-Voltage Cable Wound Generator: Steady-State and Fault Analysis, IEEE Transactions on Energy Conversion, vol. 19, No. 2, 2004, 245-250.

D.W. Swett et al., Flywheel Charging Module for Energy Storage Used in Electromagnetic Aircraft Launch System, IEEE Transactions on Magnetics, vol. 41, No. 1, 2005, 525-528.

Anders Carlsson, The back to back converter control and design, 1998, Department of Industrial Electrical Engineering and Automation, Lund Institute of Technology.

Taiwan Patent Office, "Office Action", dated Sep. 19, 2019, Taiwan.

* cited by examiner

US 10,903,773 B1

KINETIC ENERGY RECOVERY SYSTEM WITH FLYWHEEL

CROSS REFERENCE TO RELATED APPLICATION

The application is based on, and claims priority from, Taiwan Application Serial Number 108124834, filed on Jul. 15, 2019, the disclosure of which is hereby incorporated by reference herein in its entirety.

TECHNICAL FIELD

The invention relates to an energy transfer system with an energy storage flywheel, in particular to a kinetic energy recovery system with flywheel.

BACKGROUND

FIG. 1 is a schematic diagram of the architecture of a conventional energy transfer system of a flywheel and a vehicle drive motor. An energy transfer system 1 includes a flywheel module 2, drive circuit 4 and a vehicle drive motor 6.

When the energy transfer between the flywheel 2 and the drive motor 6 is to be performed, all of the energy is passed through the drive circuit 4, so that the power devices, the DC capacitors and the battery of the drive circuit 4 are subjected to considerable electrical loads.

In order to solve the above-mentioned problems, an energy transfer system with an energy storage flywheel is required. This system can increase the energy recoverable by the brakes of the drive motor, and the energy does not have to pass through all of the power electronics and DC capacitors or batteries, so that the power electronics and DC capacitors or batteries do not need to withstand all the power and cause losses.

SUMMARY

An objective of the present invention is to provide a kinetic energy recovery system for providing an energy transfer path using a flywheel electric machine and a phase coil of the drive motor to be directly connected in series, thus increasing the energy recoverable by the brake of the drive motor. And, the energy does not have to pass through all of the power electronics and DC capacitors or batteries, so that the power electronics and the DC capacitors or the batteries do not need to withstand all the power and cause losses.

The present invention achieves the above-indicated objective by providing a kinetic energy recovery system with flywheel. The kinetic energy recovery system with flywheel includes a flywheel doubly-fed electric machine, an electric motor, a drive circuit and a controller. The flywheel doubly-fed electric machine has a primary side coil and a secondary side coil. The electric motor has a phase coil connected in series with the primary side coil. The drive circuit has an AC/DC circuit and a DC/AC circuit, wherein the AC end of the AC/DC circuit is coupled to the primary side coil of the flywheel doubly-fed electric machine; the AC end of the DC/AC circuit is coupled to the secondary side coil of the flywheel doubly-fed electric machine. The controller is configured to manipulate a frequency and a phase of an output voltage and an output current of the secondary side coil, thereby controlling the frequency and phase of a voltage and a current output from the primary side coil, thereby recovering a kinetic energy of the electric motor or providing the kinetic energy to the electric motor.

Compared to a conventional energy transfer system of a flywheel and a vehicle drive motor, the present invention has several advantages.

1. The main phase coil of the flywheel doubly-fed electric machine and the phase coil of the motor are directly connected in series to form a partial energy flow path, and to reduce the energy power flowing through the power electrons.
2. The power system can use power electronics of a lower power level to achieve energy transfer.
3. The flywheel doubly-fed electric machine can be used to provide or absorb the energy of the electric motor or generator to share the load on the DC bus side.

DETAILED DESCRIPTION

The present invention provides an energy transfer path by using a flywheel electric machine and a phase coil of the drive motor to be directly connected in series, thus increasing the energy recoverable by the brake of the drive motor. Since the flywheel electric machine and the phase coil of the drive motor are directly connected in series, the energy does not have to pass through all of the power electronics and DC capacitors or batteries, so that the power electronics and the DC capacitors or the batteries do not need to withstand all the power and cause losses.

Embodiment 1

Figure 1:
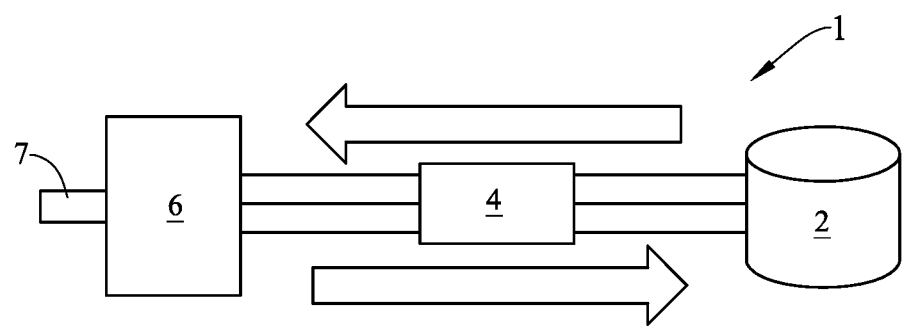
FIG. 1 is a schematic diagram of the architecture of a conventional energy transfer system of a flywheel and a vehicle drive motor.
Figure 2A:
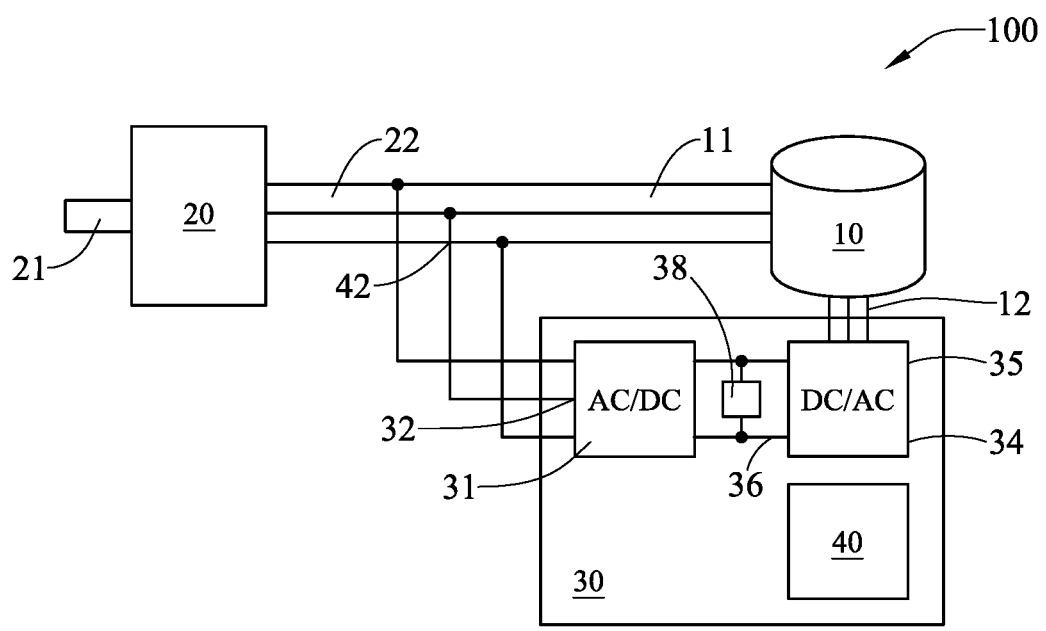
FIGS. 2A, 2B and 2C are schematic diagrams of the architecture of the kinetic energy recovery system with flywheel of the present invention.

FIG. 2A is a schematic diagram of the architecture of the kinetic energy recovery system with flywheel of the present invention. As shown in FIG. 2A, the kinetic energy recovery system with flywheel 100 includes a flywheel doubly-fed electric machine 10, an electric motor 20, a drive circuit 30 and a controller 40. The flywheel doubly-fed electric machine 10 consists of a doubly-fed electric machine and a flywheel inertia rotor. The flywheel doubly-fed electric machine 10 has a primary side coil 11 and a secondary side coil 12. The electric motor 20 has a shaft 21 and a phase coil 22. The phase coil 22 is connected in series with the primary side coil 11 is used to output and input power. The electric motor 20 can be a drive motor, a linear motor or a generator applied to an electric vehicle, an automated machine or an automation industry.

The drive circuit 30 has an AC/DC circuit 31 and a DC/AC circuit 34. The AC end 32 of the AC/DC circuit 31 and the primary side coil 11 of the flywheel doubly-fed electric machine 10 are coupled to form an AC bus 42. The AC end 35 of the DC/AC circuit 34 is coupled to the secondary side coil 12 of the flywheel doubly-fed electric machine 10. A DC bus 36 and a capacitor 38 are provided between the AC/DC circuit 31 and the DC/AC circuit 34.

The controller 40 is configured to manipulate a frequency and a phase of an output voltage and an output current of the secondary side coil 12, thereby controlling the frequency and the phase of a voltage and a current output from the primary side coil 11. The controller 40 further controls the torque and speed of the electric motor 20 to recover a kinetic energy of the electric motor 20 or provide the kinetic energy to the electric motor 20. The flywheel doubly-fed electric machine 10 and the electric motor 20 can perform two-way energy transfer. A path of energy transfer is the AC bus 42 through the connection formed by the primary side coil 11 of the flywheel doubly-fed electric machine 10 and the phase coil 22 of the electric motor 20. The manipulation of the electric motor 20 is controlled by the voltage formed by the controller 40 of the drive circuit 30 on the AC bus. The manipulation strategy depends on whether the electric motor 20 is synchronous or asynchronous. Manipulating manners are implemented using existing concepts such as Direct Torque Control or Field oriented control.

The DC/AC circuit 34 coupled to the secondary side coil 12 generates a current when the AC/DC circuit 31 coupled to the primary side coil 11 maintains a DC voltage stability. The DC/AC circuit 34 coupled to the secondary side coil 12 is in an open state to make the current of the secondary side coil 12 zero when the AC/DC circuit 31 coupled to the primary side coil 11 directly drives the electric motor 20.

The embodiments can be exemplified by taking the electric motor 20 as a drive motor of an electric vehicle as an example to illustrate the two-way energy transfer of the flywheel doubly-fed electric machine 10 and the drive motor (i.e., the electric motor 20) of the electric vehicle. When the electric vehicle is decelerating, the drive motor (i.e., the electric motor 20) outputs reverse torque to recover energy and transfer the energy to the flywheel doubly-fed electric machine 10 for storage. When the electric vehicle is accelerating, the flywheel doubly-fed electric machine 10 transmits the stored energy to the drive motor (i.e., the electric motor 20) to output forward torque.

Figure 2B:
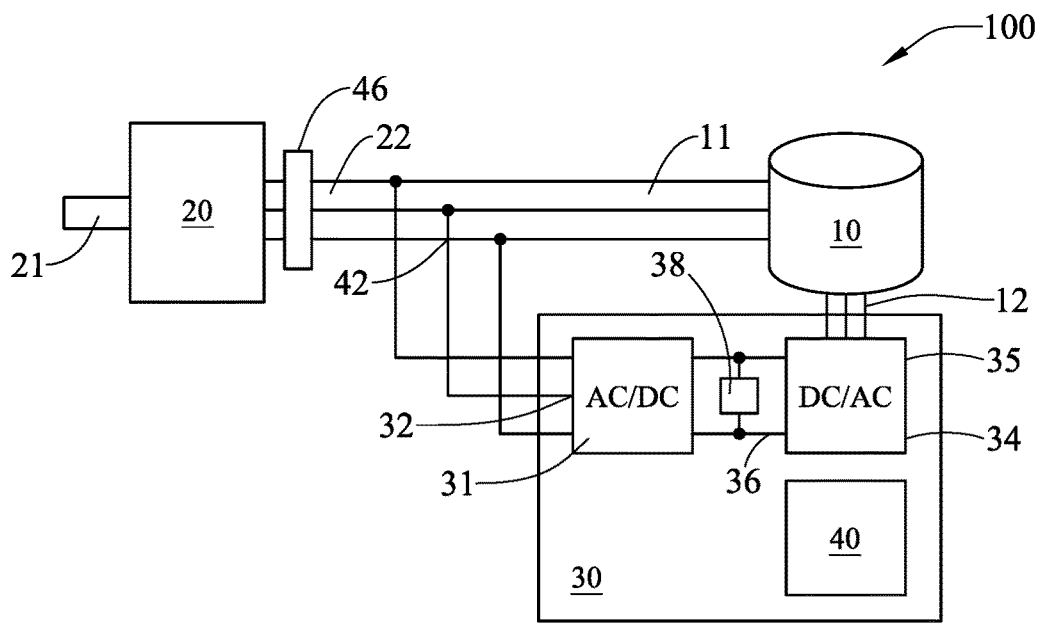

FIG. 2B shows an alternatively embodiment of the Embodiment 1 of the present invention. As shown in FIG. 2B, a connection between the primary side coil 11 of the flywheel doubly-fed electric machine 10 and the phase coil 22 of the electric motor 20 is via a multi-phase transformer 46.

Figure 2C:
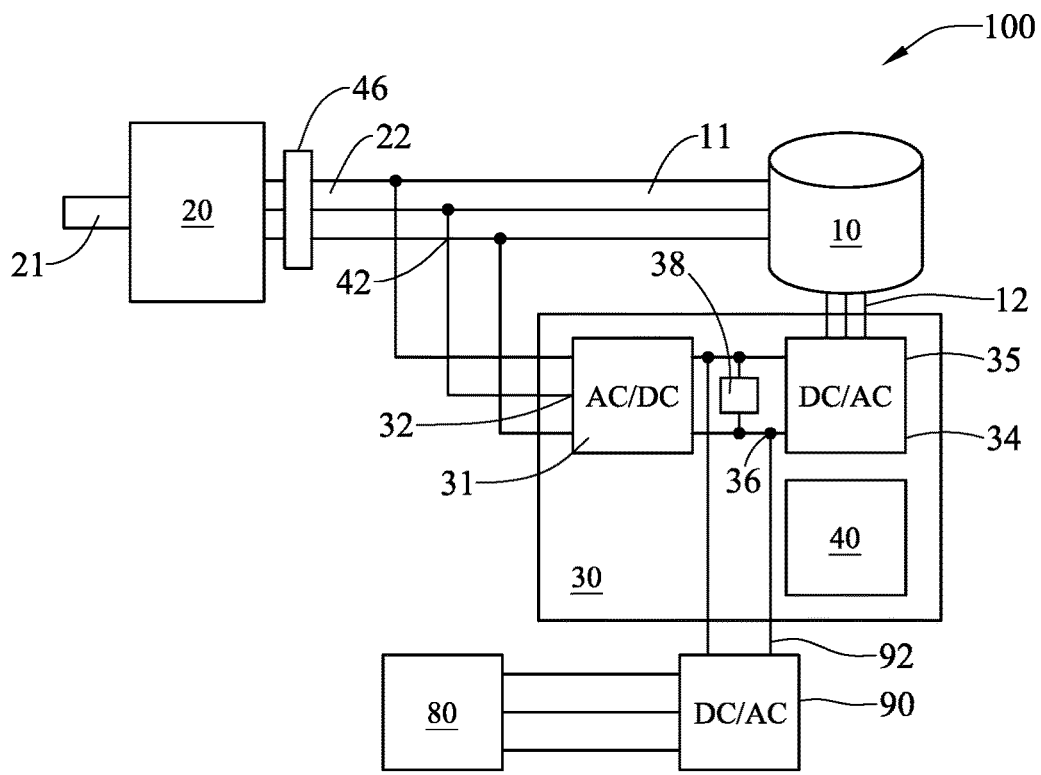

In one preferred embodiment, the kinetic energy recovery system with flywheel 100 can further be coupled to an external power grid 80 to form an uninterruptible power system for regulating the power of the power grid 80, as shown in FIG. 2C. In this architecture, the electric motor 20 becomes a generator. A DC/AC converter 90 is used to convert electrical energy from the DC bus 36 of the drive circuit 30 to three-phase power to connect to the power grid 80. A manner of coupling the kinetic energy recovery system with flywheel 100 to the power grid 80 is a series circuit 92 or a parallel transformer.

Figure 3:
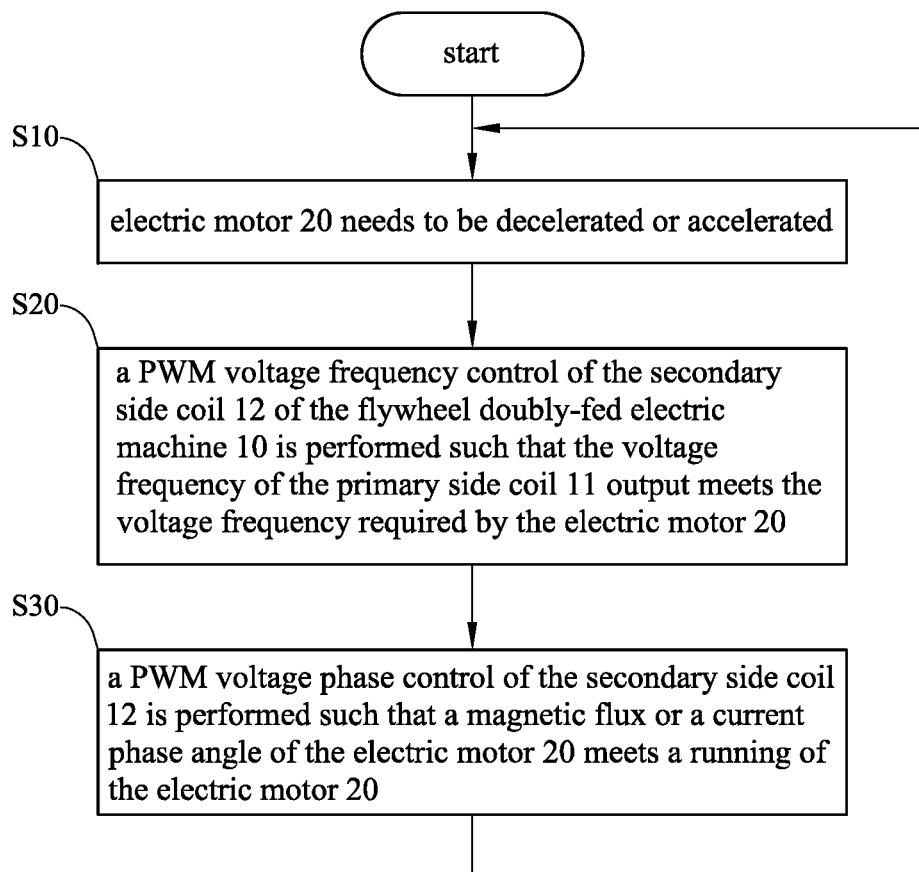
FIG. 3 is a flow chart of the manipulation method of the electric motor of the present invention.

FIG. 3 is a flow chart of the manipulation method of the electric motor of the present invention. First, the electric motor 20 needs to be decelerated or accelerated, as shown in step S10. Next, a PWM (Pulse Width Modulation) voltage frequency control of the secondary side coil 12 of the flywheel doubly-fed electric machine 10 is performed such that the output voltage frequency of the primary side coil 11 meets the voltage frequency required by the electric motor 20, as shown in step S20. Furthermore, a PWM voltage phase control of the secondary side coil 12 is performed such that a magnetic flux or a current phase angle of the electric motor 20 meets a running of the electric motor 20, as shown in step S30. The invention utilizes the manipulation of the PWM signal frequency and phase of the secondary side coil 12 of the flywheel doubly-fed electric machine 10 to make the output frequency and output phase of the primary side coil 11 meet the running requirements of the electric motor 20.

Embodiment 2

Figure 4:
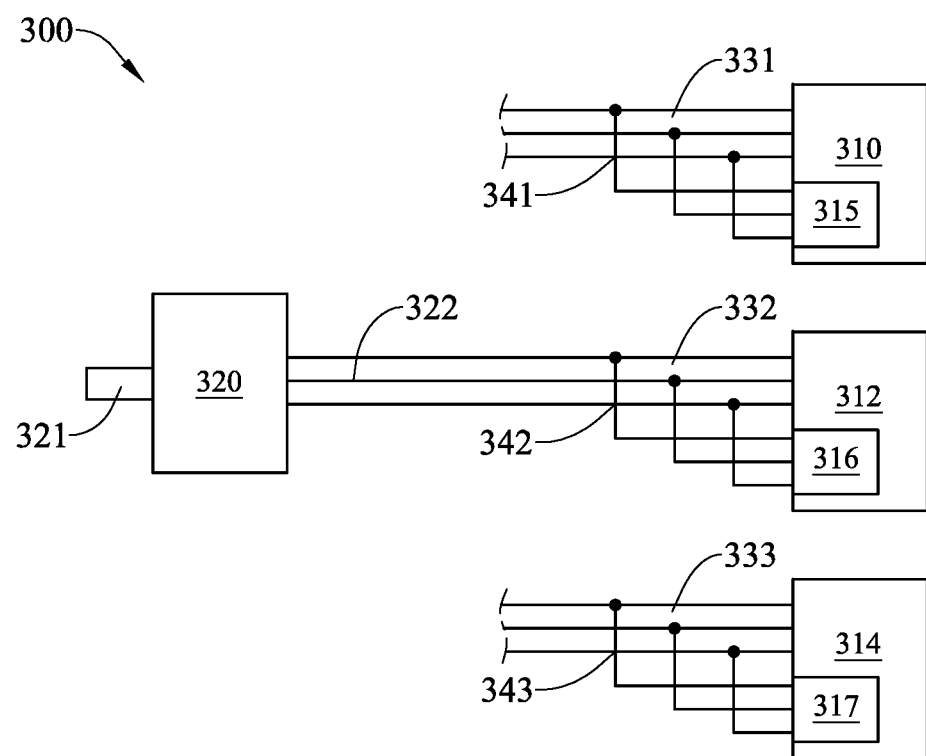
FIG. 4 is a schematic diagram of the architecture of the connection of multiple sets of flywheel doubly-fed electric machine module and one electric motor of the present invention.

FIG. 4 is a schematic diagram of the architecture of the connection of multiple sets of flywheel doubly-fed electric machine module and one electric motor of the present invention. The kinetic energy recovery system with flywheel 300 includes an electric motor 320 and a plurality of flywheel doubly-fed electric machine modules 310, 312, 314. The each flywheel doubly-fed electric machine module 310, 312, 314 has various energy storage as well as has a flywheel doubly-fed electric machine, a drive circuit, a primary side coil 331, 332, 333 and a secondary side coil, respectively. The drive circuit has an AC/DC circuit and a DC/AC circuit. The AC end of the AC/DC circuit is coupled to the primary side coils 331, 332, 333. The AC end of the DC/AC circuit is coupled to the secondary side coil. Each of the elements having the same name as in Embodiment 1 is the same and equivalent element.

The flywheel doubly-fed electric machine modules 310, 312, 314 each have a controller 315, 316, 317, respectively. The controllers 315, 316, 317 are configured to manipulate a frequency and a phase of an output voltage and an output current of the secondary side coil, thereby controlling the frequency and the phase of a voltage and a current output from the primary side coils 331, 332, 333. The controller 40 further controls the torque and speed of the electric motor 320 to recover a kinetic energy of the electric motor 320 or provide the kinetic energy to the electric motor 320.

The electric motor 320 has a shaft 321 and a phase coil 322. The phase coil 322 is connected in series with the primary side coils 331, 332, 333. Paths of energy transfer are AC bus 341, 342, 343 through the connections formed by the primary side coils 331, 332, 333 of the flywheel doubly-fed electric machine modules 310, 312, 314 and the phase coil 322 of the electric motor 320. The electric motor 320 can be a drive motor, a linear motor or a generator applied to an electric vehicle, an automated machine or an automation industry.

The kinetic energy recovery system with flywheel 300 can sequentially connect the flywheel doubly-fed electric machine modules 310, 312, 314 and the AC bus 341, 342, 343. When the flywheel doubly-fed electric machine modules 310, 312, 314 are to be used for energy storage, the flywheel doubly-fed electric machine module with the lowest energy should be added first. And, when the energy of the flywheel doubly-fed electric machine modules 310, 312, 314 are to be extracted the flywheel doubly-fed electric machine module with the highest energy should be added first. When the electric motor 320 is to extract the energy of the flywheel doubly-fed electric machine modules 310, 312, 314, the stored energies are sorted, and the flywheel doubly-fed electric machine modules with the largest stored energy to the smaller energy storage are sequentially added. When the electric motor 320 is to output energy to the flywheel doubly-fed electric machine modules 310, 312, 314, the stored energies are sorted, and the flywheel doubly-fed electric machine modules with the lowest stored energy to the larger energy storage are sequentially added.

Figure 5:
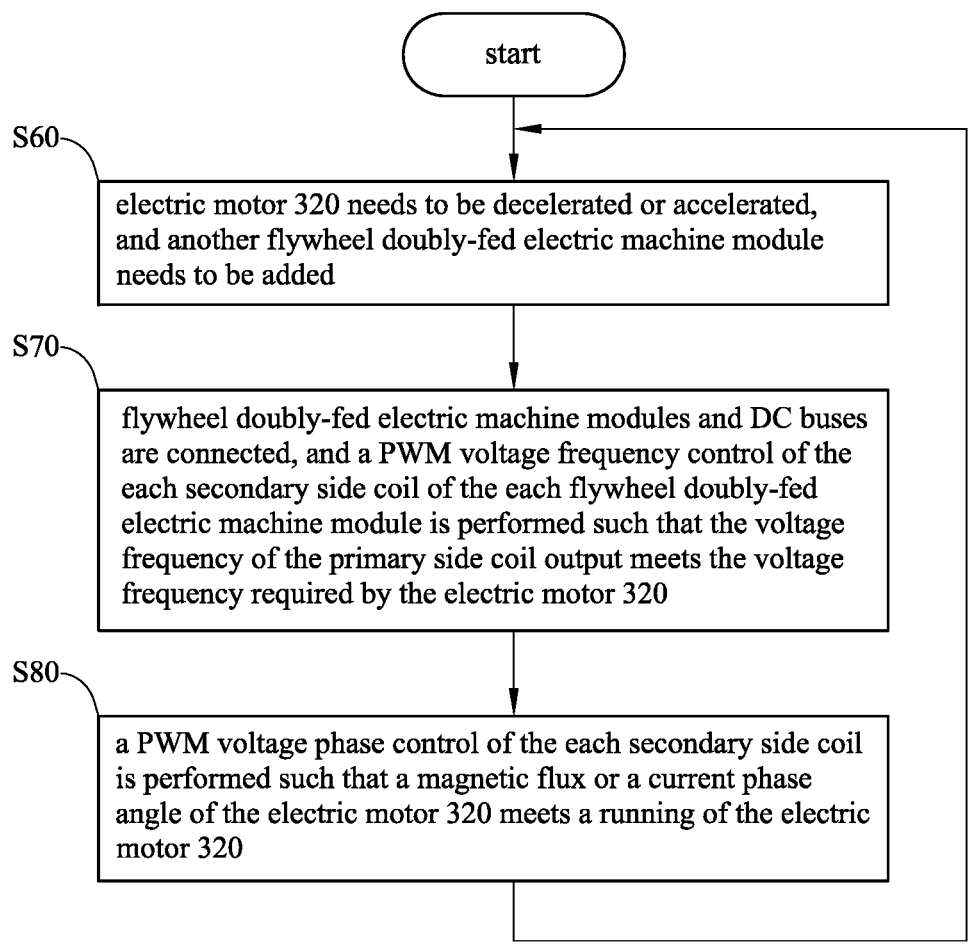
FIG. 5 is a flow chart of the manipulation method of multiple sets of flywheel doubly-fed electric machine module and one electric motor of the present invention.

FIG. 5 is a flow chart of the manipulation method of multiple sets of flywheel doubly-fed electric machine module and one electric motor of the present invention. First, the electric motor 320 needs to be decelerated or accelerated, and another flywheel doubly-fed electric machine module needs to be added, as shown in step S60. Next, flywheel doubly-fed electric machine modules and DC buses are connected, and a PWM voltage frequency control of the each secondary side coil of the each flywheel doubly-fed electric machine module is performed such that the output voltage frequency of the primary side coil meets the voltage frequency required by the electric motor 320, as shown in step S70. Furthermore, a PWM voltage phase control of the each secondary side coil is performed such that a magnetic flux or a current phase angle of the electric motor 320 meets a running of the electric motor 320, as shown in step S80.

Embodiment 3

Figure 6A:
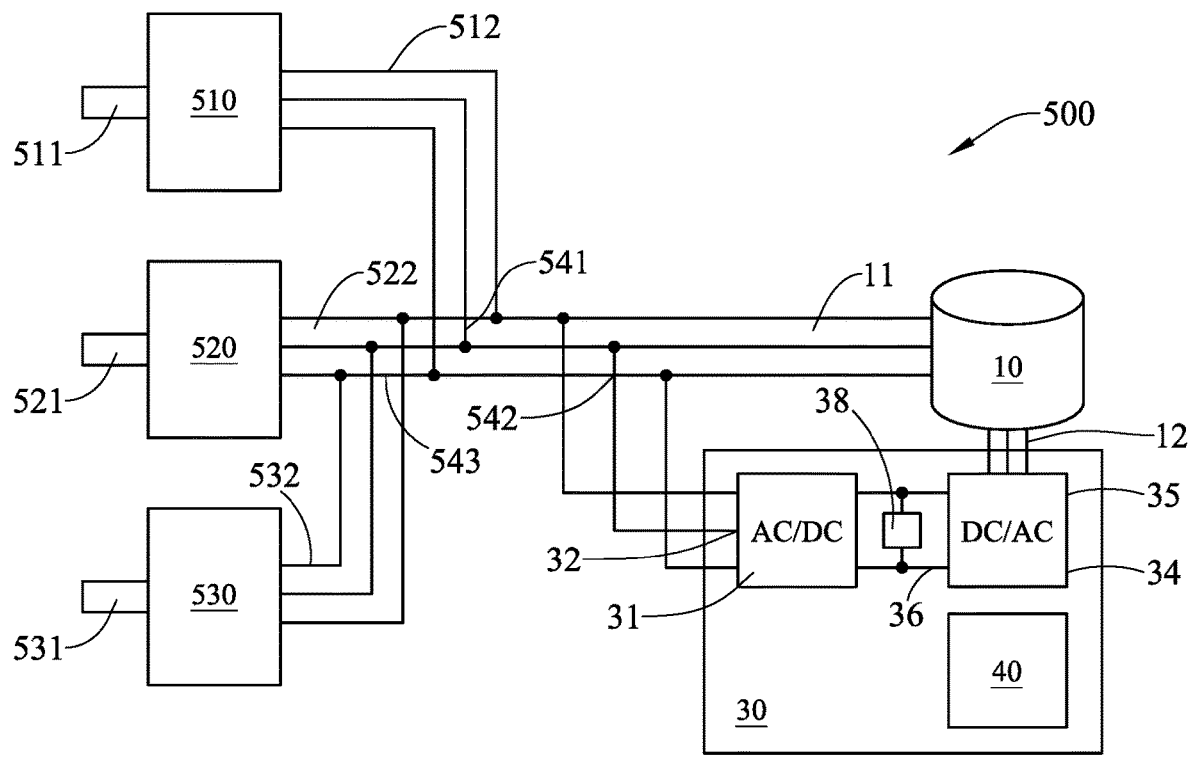
FIGS. 6A and 6B are schematic diagrams of the architecture of the connection of multiple sets of electric motor and one flywheel doubly-fed electric machine of the present invention.

FIG. 6A is a schematic diagram of the architecture of the connection of multiple sets of electric motor and one flywheel doubly-fed electric machine of the present invention. As shown in FIG. 6A, the kinetic energy recovery system with flywheel 500 includes a flywheel doubly-fed electric machine 10, a drive circuit 30, a controller 40 and electric motor 510, 520, 530. The elements, the flywheel doubly-fed electric machine 10, the drive circuit 30, the controller 40, of the kinetic energy recovery system with flywheel 500 having the same reference numerals as in Embodiment 1 are the same and equivalent elements.

The electric motors 510, 520, 530 each have a shaft 511, 521, 531 and a phase coil 512, 522, 532, respectively. The phase coil 512, 522, 532 are connected in series with the primary side coil 11. Paths of energy transfer are AC buses 541, 542, 543 through the connections formed by the primary side coil 11 of the flywheel doubly-fed electric machine 10 and the phase coil 512, 522, 532 of the electric motors 510, 520, 530. The shaft 511, 521, 531 are used to output and input power.

Figure 6B:
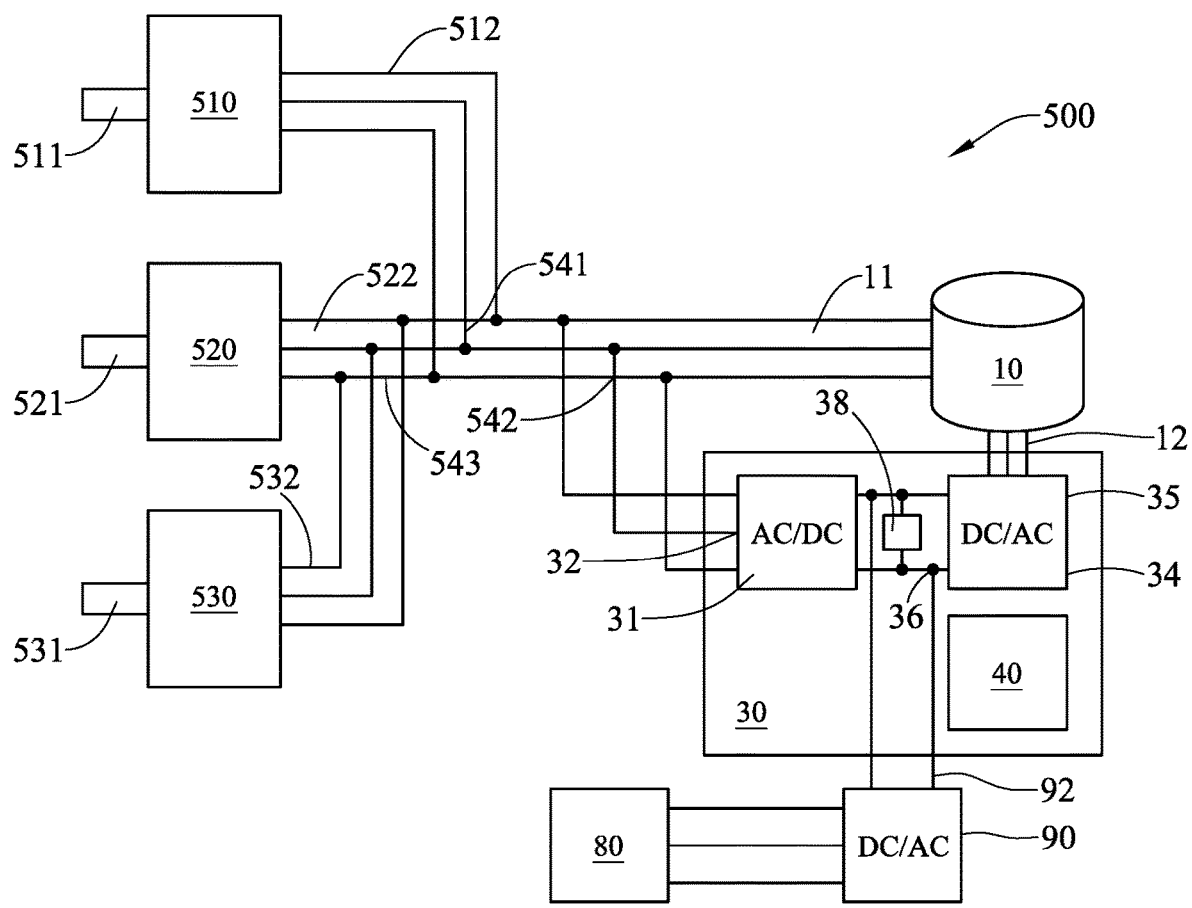

The flywheel doubly-fed electric machine 10 is controlled by the secondary side coil 12 to determine the output voltage of the primary side coil 11 when the each electric motor 510, 520, 530 is a motor. The flywheel doubly-fed electric machine 10 is controlled by the secondary side coil 12 to determine an input voltage of the primary side coil 11 when the each electric motor 510, 520, 530 is a generator. In one preferred embodiment, the kinetic energy recovery system with flywheel 500 can further be coupled to an external power grid 80 to form an uninterruptible power system for regulating the power of the power grid 80, as shown in FIG. 6B.

Figure 7:
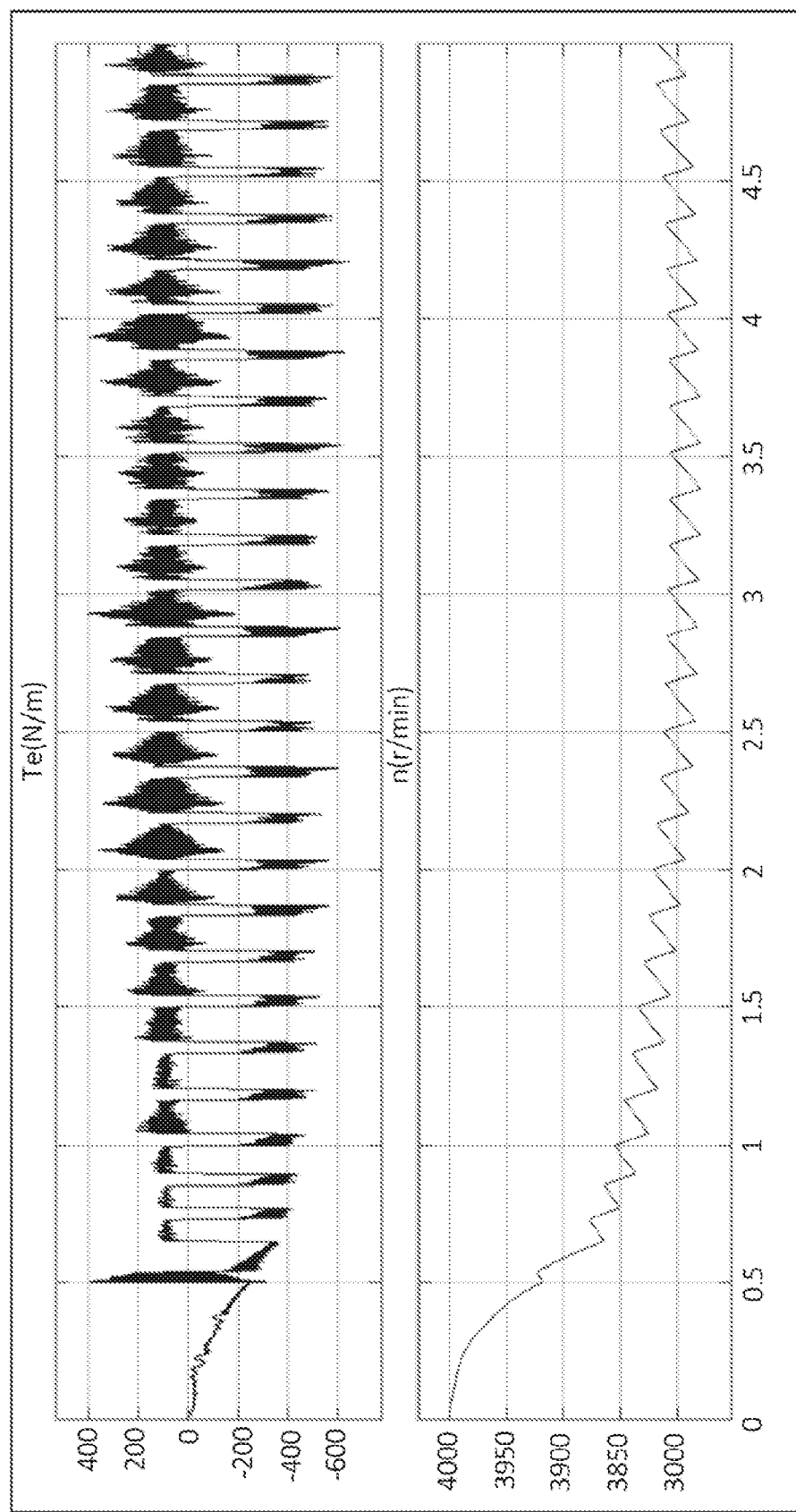
FIG. 7 shows the output energy of the flywheel versus time.
Figure 8:
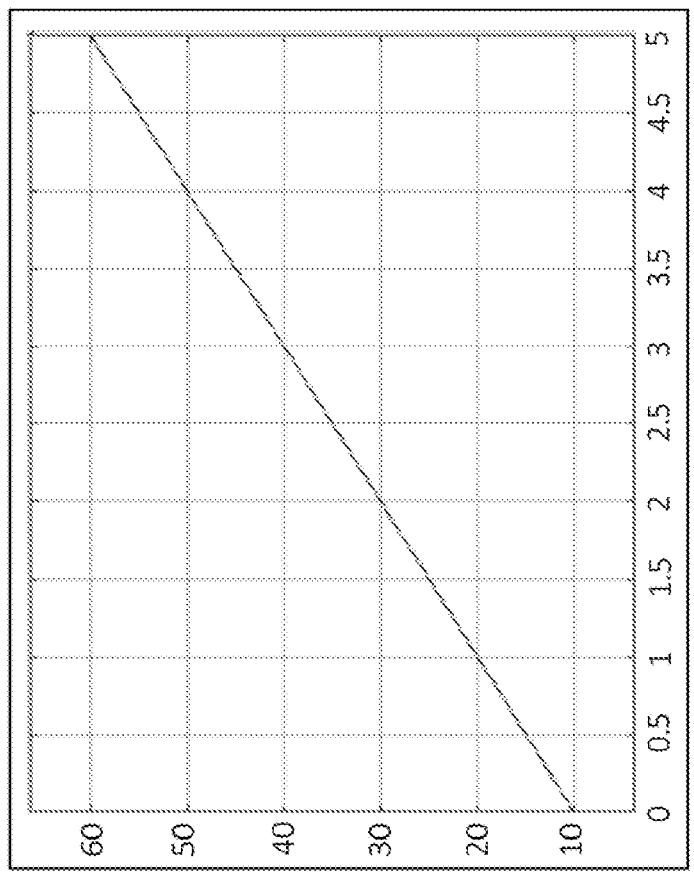
FIG. 8 shows the load torque of the electric motor versus time.
Figure 9:
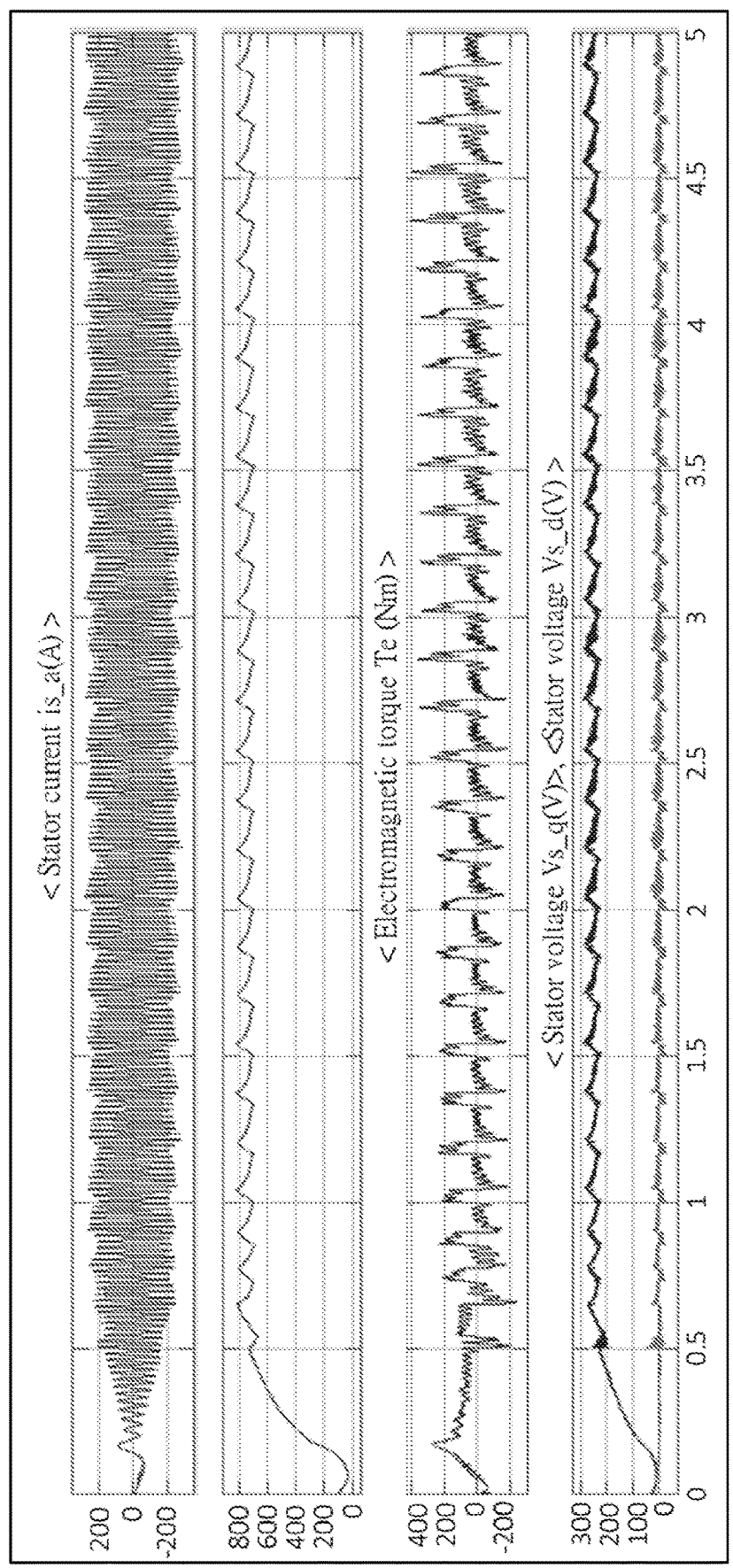
FIG. 9 shows the output energy of the electric motor versus time.

The followings are the simulation settings and illustrations of the kinetic energy recovery system with flywheel of the present invention. The flywheel doubly-fed electric machine is an energy storage flywheel, and the electric motor is a permanent magnet synchronous motor. The voltage on the primary side of the flywheel doubly-fed electric machine is synchronized with the rotor of the electric motor through the control of the secondary side. The initial speed of the flywheel is 4000 rpm, the moment of inertia is 5 kg-m2, and the stored energy is 428 kJ. FIG. 7 shows the output energy of the flywheel versus time. As shown in FIG. 7, the speed of the flywheel drops rapidly from 4000 rpm to 3800 rpm, and the energy releases about 42800 Joule. At about 2.5 seconds, the speed begins to stabilize. FIG. 8 shows the load torque of the electric motor versus time. The energy output from the flywheel is applied to the load torque of the permanent magnet synchronous motor, which is gradually increased from 10 Nm, and the load energy absorption reaches 60 Nm at 5 seconds. FIG. 9 shows the output energy of the electric motor versus time. After the flywheel transferring energy to the permanent magnet synchronous motor, the speed of the motor is increased from an initial speed of 100 rpm to 750 rpm, and the motor absorbs energy of 1514 Joule. At about 0.7 second, the speed begins to stabilize.

What is claimed is:

1. A kinetic energy recovery system with flywheel, comprising:
   a flywheel doubly-fed electric machine, having a primary side coil and a secondary side coil;
   an electric motor, having a phase coil connected in series with the primary side coil;
   a drive circuit, having an AC/DC circuit and a DC/AC circuit, wherein the AC end of the AC/DC circuit is coupled to the primary side coil of the flywheel doubly-fed electric machine, and the AC end of the DC/AC circuit is coupled to the secondary side coil of the flywheel doubly-fed electric machine; and
   a controller, configured to manipulate a frequency and a phase of an output voltage and an output current of the secondary side coil, thereby controlling the frequency and the phase of a voltage and a current output from the primary side coil, thereby recovering a kinetic energy of the electric motor or providing the kinetic energy to the electric motor.

2. The kinetic energy recovery system with flywheel as recited in claim 1, wherein the DC end of the drive circuit can be coupled to a power grid to form an uninterruptible power system, and a manner of coupling to the power grid is a series circuit switch or a parallel transformer.

3. The kinetic energy recovery system with flywheel as recited in claim 1, wherein the electric motor can be a drive motor, a linear motor or a generator applied to an electric vehicle, an automated machine or an automation industry.

4. The kinetic energy recovery system with flywheel as recited in claim 1, wherein the DC/AC circuit coupled to the secondary side coil generates a current when the AC/DC circuit coupled to the primary side coil maintains a DC voltage stability; the DC/AC circuit is in an open state to make the current of the secondary side coil zero when the AC/DC circuit directly drives the electric motor.

5. The kinetic energy recovery system with flywheel as recited in claim 1, wherein recovering a kinetic energy of the electric motor or providing the kinetic energy to the electric motor comprises the following steps:
   a PWM (Pulse Width Modulation) voltage frequency control of the secondary side coil of the flywheel doubly-fed electric machine is performed such that the output voltage frequency of the primary side coil meets the voltage frequency required by the electric motor when the electric motor needs to be decelerated or accelerated; and a PWM voltage phase control of the secondary side coil is performed such that a magnetic flux or a current phase angle of the electric motor meets a running of the electric motor.

6. A kinetic energy recovery system with flywheel, comprising:

a plurality of flywheel doubly-fed electric machine modules, the each flywheel doubly-fed electric machine module having various energy storage as well as having a flywheel doubly-fed electric machine, a drive circuit, a primary side coil and a secondary side coil, wherein the each drive circuit has an AC/DC circuit and a DC/AC circuit, and the AC end of the AC/DC circuit is coupled to the primary side coil, and the AC end of the DC/AC circuit is coupled to the secondary side coil;

an electric motor, having a phase coil connected in series with the each primary side coil; and a plurality of controllers, configured to manipulate a frequency and a phase of an output voltage and an output current of the each secondary side coil, thereby controlling the frequency and the phase of a voltage and a current output from the each primary side coil, thereby recovering a kinetic energy of the electric motor or providing the kinetic energy to the electric motor;

wherein the flywheel doubly-fed electric machine module with the lowest energy storage is first added when the kinetic energy of the electric motor is to be recovered; the flywheel doubly-fed electric machine module with the most energy storage is first added when the kinetic energy is to be supplied to the electric motor.

7. The kinetic energy recovery system with flywheel as recited in claim 6, wherein the DC end of the each drive circuit can be coupled to a power grid to form an uninterruptible power system, and a manner of coupling to the power grid is a series circuit switch or a parallel transformer.

8. The kinetic energy recovery system with flywheel as recited in claim 6, wherein the electric motor can be a drive motor, a linear motor or a generator applied to an electric vehicle, an automated machine or an automation industry.

9. The kinetic energy recovery system with flywheel as recited in claim 6, wherein recovering a kinetic energy of the electric motor or providing the kinetic energy to the electric motor comprises the following steps:

a PWM voltage frequency control of the each secondary side coil of the each flywheel doubly-fed electric machine module is performed such that the output voltage frequency of the primary side coil meets the voltage frequency required by the electric motor when the electric motor needs to be decelerated or accelerated and needs add another flywheel doubly-fed electric machine module; and a PWM voltage phase control of the each secondary side coil is performed such that a magnetic flux or a current phase angle of the electric motor meets a running of the electric motor.

10. A kinetic energy recovery system with flywheel, comprising:

a flywheel doubly-fed electric machine, having a primary side coil and a secondary side coil;

a plurality of electric motors, the each electric motor having a phase coil connected in series with the primary side coil, wherein the each electric motor can be a motor or a generator;

a drive circuit, having an AC/DC circuit and a DC/AC circuit, wherein the AC end of the AC/DC circuit is coupled to the primary side coil of the flywheel doubly-fed electric machine, and the AC end of the DC/AC circuit is coupled to the secondary side coil of the flywheel doubly-fed electric machine; and a controller, configured to manipulate a frequency and a phase of an output voltage and an output current of the secondary side coil, thereby controlling the frequency and the phase of a voltage and a current output from the primary side coil, thereby recovering a kinetic energy of the electric motor or providing the kinetic energy to the electric motor;

wherein the flywheel doubly-fed electric machine is controlled by the secondary side coil to determine the output voltage of the primary side coil when the each electric motor is the motor; the flywheel doubly-fed electric machine is controlled by the secondary side coil to determine an input voltage of the primary side coil when the each electric motor is the generator.

11. The kinetic energy recovery system with flywheel as recited in claim 10, wherein the DC end of the drive circuit can be coupled to a power grid to form an uninterruptible power system, and a manner of coupling to the power grid is a series circuit switch or a parallel transformer.

12. The kinetic energy recovery system with flywheel as recited in claim 10, wherein the flywheel doubly-fed electric machine can be selectively controlled to generate the input voltage corresponding to the each electric motor when the electric each motor is the generator with various output voltages.

13. The kinetic energy recovery system with flywheel as recited in claim 10, wherein recovering a kinetic energy of the electric motor or providing the kinetic energy to the electric motor comprises the following steps:

a PWM voltage frequency control of the secondary side coil of the flywheel doubly-fed electric machine is performed such that the output voltage frequency of the primary side coil meets the voltage frequency required by the electric motor when the electric motor needs to be decelerated or accelerated; and a PWM voltage phase control of the secondary side coil is performed such that a magnetic flux or a current phase angle of the electric motor meets a running of the electric motor.

14. A kinetic energy recovery system with flywheel, comprising:

a flywheel doubly-fed electric machine, having a primary side coil and a secondary side coil;

an electric motor, having a phase coil connected with the primary side coil, wherein a connection between the primary side coil of the flywheel doubly-fed electric machine and the phase coil of the electric motor is via a multi-phase transformer;

a drive circuit, having an AC/DC circuit and a DC/AC circuit, wherein the AC end of the AC/DC circuit is coupled to the primary side coil of the flywheel doubly-fed electric machine, and the AC end of the DC/AC circuit is coupled to the secondary side coil of the flywheel doubly-fed electric machine; and a controller, configured to manipulate a frequency and a phase of an output voltage and an output current of the secondary side coil, thereby controlling the frequency and the phase of a voltage and a current output from the primary side coil, thereby recovering a kinetic energy of the electric motor or providing the kinetic energy to the electric motor.

15. The kinetic energy recovery system with flywheel as recited in claim 14, wherein the DC end of the drive circuit can be coupled to a power grid to form an uninterruptible power system, and a manner of coupling to the power grid is a series circuit switch or a parallel transformer.

16. The kinetic energy recovery system with flywheel as recited in claim 14, wherein the electric motor can be a drive motor, a linear motor or a generator applied to an electric vehicle, an automated machine or an automation industry.

17. The kinetic energy recovery system with flywheel as recited in claim 14, wherein the DC/AC circuit coupled to the secondary side coil generates a current when the AC/DC circuit coupled to the primary side coil maintains a DC voltage stability; the DC/AC circuit is in an open state to make the current of the secondary side coil zero when the AC/DC circuit directly drives the electric motor.

18. The kinetic energy recovery system with flywheel as recited in claim 14, wherein recovering a kinetic energy of the electric motor or providing the kinetic energy to the electric motor comprises the following steps:
   a PWM voltage frequency control of the secondary side coil of the flywheel doubly-fed electric machine is performed such that the output voltage frequency of the primary side coil meets the voltage frequency required by the electric motor when the electric motor needs to be decelerated or accelerated; and
   a PWM voltage phase control of the secondary side coil is performed such that a magnetic flux or a current phase angle of the electric motor meets a running of the electric motor.

* * * * *